United States Patent Office 3,402,987
Patented Sept. 24, 1968

3,402,987
DYEING OF POLYMERIC ARTICLES TREATED WITH A GRAFT COPOLYMER OF AN N-VINYL LACTAM POLYMER
Philip B. Dalton, Franklin Square, N.Y., and Marvin R. Leibowitz, Edison, N.J., assignors to GAF Corporation, a corporation of Delaware
No Drawing. Filed Jan. 20, 1964, Ser. No. 338,608
12 Claims. (Cl. 8—31)

ABSTRACT OF THE DISCLOSURE

A method for improving the dye receptivity of cellulosic and synthetic polymeric articles by inclusion therein or treatment thereof with a graft copolymer of a non-aqueous vinyl monomer on an N-vinyl lactam polymer substrate. A method of dyeing the resulting graft copolymer-treated articles.

---

This invention relates to treatment of cellulosic and synthetic polymeric articles and more particularly to treatment of cellulosic and synthetic polymeric shaped articles to improve their dye receptivity.

It is well known that synthetic polymeric shaped articles often have poor dye receptivity. A number of techniques have been used to improve the dye receptivity of these articles. These techniques include (1) use of additives such as chemicals, polymers or metallic compounds; (2) surface modification such as chemical reaction on the surface of the article; (3) graft copolymers such as dyeable polymers are grafted on to the polymer chain; (4) miscellaneous methods such as modified dyes, polymer swelling agents or the like. It is also known that cellulosic materials such as cotton and paper are not receptive to certain types of dyestuffs such as acid dyes.

It is an object of this invention to provide a process for the improvement of the dye receptivity of both cellulosic and synthetic polymeric shaped articles. Another object of this invention is to provide a new class of N-vinyl lactam graft copolymers which are useful in improving the dye receptivity of cellulosic and synthetic polymeric shaped articles. Other objects and advantages of the present invention will appear as this description proceeds.

The attainment of the objects of this invention is made possible by the discovery that use of a graft copolymer of an N-vinyl lactam polymer having the formula

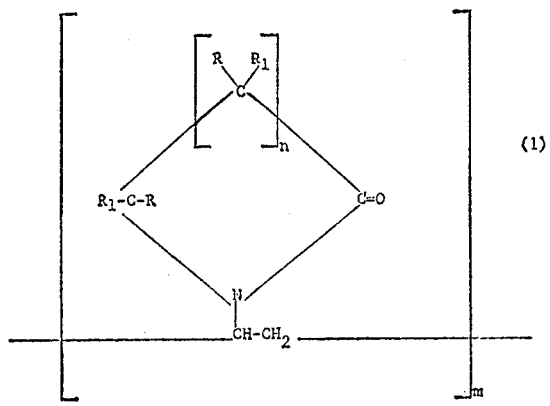

wherein R is either hydrogen, methyl or ethyl, $R_1$ is either hydrogen or methyl, $n$ is an integer of from 2 to 4 and $m$ is an integer of from 4 to 20,000 and is the number of N-vinyl lactam units in the polymer, prepared by reacting the N-vinyl lactam polymer with a nonaqueous vinyl monomer such as vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2-ethylhexyl acrylate, hexyl acrylate, styrene, methoxy styrene, ethylstyrene, chlorostyrene or the like, in the treatment of cellulosic and synthetic polymeric shaped articles improves dye receptivity.

N-vinyl lactam polymers characterized by the general Formula 1 are commercially available in a variety of forms, concentrations and molecular weights. Methods for the manufacture of these polymers are well known in the art. For example, U.S. Patent 2,317,804 discloses a suitable method for preparing N-vinyl lactams. U.S. Patents 2,265,450 and 2,335,454 disclosed methods for preparing N-vinyl lactam polymers and their aqueous solutions.

N-vinyl lactams which may be employed to produce aqueous solutions of N-vinyl lactam polymers for use in preparing graft copolymers for this invention include the N-vinyl derivatives of gamma, delta and epsilon lactams (N-vinyl derivatives of the cyclic amides of gamma, delta and epsilon amino carboxylic acids of the aliphatic series) and the lower alkyl (methyl or ethyl) substituted derivatives of such lactams. Among this group, N-vinyl-2-pyrrolidone (otherwise referred to as 1-vinyl-2-pyrrolidone or N-vinyl-α-pyrrolidone) is a preferred monomer. As further examples of N-vinyl lactams operative herein, and which may be prepared in known manner by N-vinylation of the corresponding lactams at elevated temperatures in the manner disclosed in U.S. Patent 2,317,084, there may be mentioned the N-vinyl-substituted derivatives of the following lactams: 3,3-dimethyl-2-pyrrolidone, 4,4-dimethyl-2-pyrrolidone, 5,5-dimethyl-2-pyrrolidone, 3-ethyl-2-pyrrolidone, 4-ethyl-2-pyrrolidone, 5-ethyl-2-pyrrolidone, 3-methyl-2-pyrrolidone, 4-methyl-2-pyrrolidone, 5-methyl-2-pyrrolidone, 3,3,5-trimethyl-2-pyrrolidone, 3,5,5-trimethyl-2-pyrrolidone, 4,5,5-trimethyl-2-pyrrolidone, 2-piperidone, 5,5-diethyl-2-piperidone, 5,6-dimethyl-2-piperidone, 4-ethyl-2-piperidone, 6-ethyl-2-piperidone, 5-ethyl-6-methyl-2-piperidone, 6-ethyl-3-methyl-2-piperidone, 3-methyl-2-piperidone, 4-methyl-2-piperidone, 5-methyl-2-piperidone, 6-methyl-2-piperidone, 2-caprolactam, 3,6-dimethyl-2-caprolactam, 4,6-dimethyl-2-caprolactam, 4,7-dimethyl-2-caprolactam, 7,7-diethyl-2-caprolactam, 3-ethyl-2-caprolactam, 5-ethyl-2-caprolactam, 6-ethyl-2-caprolactam, 7-ethyl-2-caprolactam, 4-ethyl-6-methyl-2-caprolactam, 6-ethyl-4-methyl-2-caprolactam, 3-methyl-2-caprolactam, 4-methyl-2-caprolactam, 5-methyl-2-caprolactam, 6-methyl-2-caprolactam or the like.

Nonaqueous vinyl monomers which may be used in the preparation of N-vinyl lactam graft polymers include vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, dodecyl vinyl ether, octadecyl vinyl ether, phenyl vinyl ether, 2-oxyethyl vinyl ether, methyl acrylate, ethyl acrylate, 2-ethylhexyl acrylate, hexyl acrylate, dodecyl acrylate, octadecyl acrylate, styrene, 2-methoxystyrene, 2-methylstyrene, 2-chlorostyrene, 2-ethylstyrene, their isomers, their mixtures or the like.

A preferred group of vinyl monomers for use in preparing graft polymers of N-vinyl lactams are the acrylic ester monomers described in the copending application of Grosser and Leibowitz Ser. No. 69,572 filed Nov. 16, 1960, now U.S. Patent No. 3,244,658. Another preferred vinyl monomer is styrene whose use in preparing graft polymers of N-vinyl lactams is described and claimed in the copending application of Grosser and Leibowitz Ser. No. 69,571 filed Nov. 16, 1960, now U.S. Patent No. 3,244,657. Briefly, the process for preparing a N-vinyl lactam graft copolymer involves reaction of a N-vinyl lactam polymer with a nonaqueous dissimilar vinyl monomer under polymerization conditions in the presence of a free radical supplying polymerization catalyst.

Molecular weights of water soluble N-vinyl lactam polymers useful in preparing graft copolymers for use in this invention may range from about 400 to 2,000,000 or higher. The molecular weight of the N-vinyl lactam polymer will depend on the degree of polymerization. Usually the degree of polymerization and relative molecular weights of these polymers are expressed in terms of Fickentscher K values. The method of determining K values is given in Modern Plastics, 23, No. 3, 157–61, 212, 214, 216, 218 (1945). N-vinyl lactam polymers having K values of about 10 to 200 and preferably about 20 to 60 or their mixtures are used in preparing graft copolymers for this invention.

The graft copolymerization reaction is substantially quantitative in that emulsions are produced containing the N-vinyl lactam polymer-vinyl monomer graft copolymer in the dispersed nonaqueous phase with little or no polymeric products being dissolved in the continuous aqueous phase. The weight ratio of N-vinyl lactam polymer to vinyl monomer which is used in preparing these graft copolymers is optional depending on the desired properties, preferably ranging from about 5:95 to 60:40. Usually it is desirable to carry out the graft polymerization in such a manner that the finished aqueous emulsion contains from about 10 to 60% graft copolymer.

The significant differences between these N-vinyl lactam copolymers and other types of N-vinyl lactam polymers is illustrated schematically below in Formulas 2 to 6 inclusive wherein A represents an N-vinyl lactam monomer and B represents a dissimilar nonaqueous vinyl monomer.

(a) Vinyl homopolymer

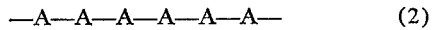  (2)

(b) Random type copolymers

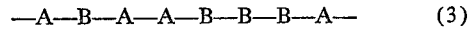  (3)

(c) True interpolymer copolymers

  (4)

(d) Block copolymers

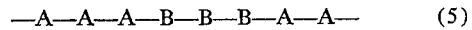  (5)

(e) Graft copolymers

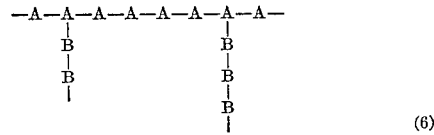  (6)

These graft copolymers may be used in the treatment of cellulosic and synthetic polymeric shaped articles to improve their dye receptivity either by intimately mixing the graft copolymer with the polymeric material prior to processing or by surface coating the polymeric material prior to dyeing with an emulsion of the graft copolymer. Generally, it is preferable to treat the polymeric article with sufficient graft copolymer so that the treated article contains from about 0.1 to 20% of the active components of the graft copolymer (based on the weight of the treated article).

Where possible, incorporation of the graft copolymer with the polymeric material prior to processing is preferable. Incorporation assures dispersion of the graft copolymer throughout the polymeric shaped article and when the article is dyed, the dye disperses throughout the article to provide a dyed article which is more resistant to crocking than when the article is surface treated with the graft copolymer prior to dyeing. It is particularly desirable to incorporate the graft copolymer in the polymeric material if the treated material is to undergo further processing or unusual wear. When an economical application is preferred, an emulsion of the graft copolymer may be applied to the surface of the polymeric article and dried to form the dye receptive coating. It is to be understood that in both of these types of applications the graft copolymer does not undergo chemical reaction with the polymeric material forming the shaped article.

Graft copolymer emulsions have a number of properties which are advantageous when they are used in the present invention. Their emulsions have low to medium viscosities, generally below about 2500 cps. (Centipoise-Brookfield Viscosimeter) and are suitable both for surface treatment of and incorporation in polymeric materials. These emulsions have low toxicities, are not flammable and have tolerance toward a large number of other chemical materials. These properties are particularly desirable because the special handling precautions that are normally required for most commercial polymer emulsions are not necessary when these graft copolymers are used in the treatment of polymeric materials. These graft copolymer emulsions have the further advantage that the stability of their emulsions may be further improved by addition of small amounts of emulsifiers, stabilizers, viscosity modifiers or the like, when required.

In contrast, emulsions of other types of copolymers of N-vinyl lactam produced by the methods of the prior art have a number of disadvantages when used in the treatment of polymeric materials to improve dye receptivity. Other types of copolymer emulsions may have viscosities as high as 75,000 cps. or more and must be diluted before they are used in treatment of polymeric materials prior to dyeing. They also have the disadvantage that opaque films are produced when they are applied to the material to be dyed and clear, bright shades are not obtained. Examination of emulsions of these other types of copolymers indicates that they are predominantly mixtures of water soluble N-vinyl lactam polymers and water insoluble vinyl polymers as well as water soluble and water insoluble copolymers. The complexity of these mixtures generally make them unsuitable for use in the treatment of polymeric materials to improve dye receptivity because each of the components in the mixture has a different affinity for the dye and satisfactory dyeings are not obtained.

Cellulosic and synthetic polymeric shaped articles which may be treated by the process disclosed by this invention include cellulosic and synthetic polymeric structures in the form of fibers, filaments, yarns, slubbings, warps, fabrics, bristles, films, tubings, molded articles or the like. Such articles may be fabricated from either supported or unsupported polymers. As examples of cellulosic materials useful in the fabrication of the shaped articles, there may be mentioned cellulosic materials such as cotton or paper, regenerated cellulose such as rayon, cellulose acetate, cellulose triacetate, cellulose butyrate, cellulose nitrate, ethyl cellulose or the like. As examples of synthetic polymeric materials which may be used, there may be mentioned polyethylene, polypropylene, polybutylene, polyvinyl chloride, polyvinyl fluoride, poly(chlorotrifluoroethylene), poly(tetrafluoroethylene), poly(vinylidene chloride), copolymers of vinyl chloride and vinyl acetate, copolymers of vinyl chloride and vinylidene chloride, acrylonitrile polymers, polystyrene, rubber hydrochloride, copolymers of acrylonitrile and styrene, terpolymers of acrylonitrile, butadiene and styrene, poly(methyl methacrylate), polycarbonate, polyethylene terephthalates such as Dacron and Mylar or the like. Mixtures of the above polymers may also be used.

A preferred method for applying graft copolymers to cellulosic and other polymeric shaped articles is to dip the article to be dyed into an emulsion of the desired graft copolymer. The article is then removed from the emulsion and dried at a temperature of about 40 to 100° C. with the preferred temperature being about 60° C. The dried article is then dyed. If desired, the article may be coated with graft copolymer emulsion and air dried at room temperature.

Anhydrous graft copolymers obtained by drying copolymer emulsions may also be employed. When anhydrous graft copolymers are used, a preferred method is to compound the graft copolymers with the polymeric material prior to its fabrication in the form of a shaped article. The graft copolymer is intimately dispersed in the polymeric material during compounding. Generally, this type of compounding is preferred when the shaped article is to undergo further processing such as machining, spinning, extruding or the like. It will also be understood that anhydrous graft copolymers may be dissolved in nonaqueous solvents and applied as surface coatings. Emulsions of graft copolymers may also be compounded with emulsions of polymers and used in the form of emulsions. Graft copolymers of N-vinyl lactam polymers have excellent compatibilities in a variety of resins and polymers both in emulsion and dry forms, so they are well suited for use in any of these procedures.

Cellulosic and polymeric materials treated with graft copolymers of N-vinyl lactam polymers show improved dye receptivity with acid types, basic types and acid metallized dyestuffs. The dyeing procedures normally used with these various types of dyestuffs may be employed. As examples of acid type dyestuffs which show improved dye receptivity there may be mentionned Acid Yellow 17, Acid Orange 3, Acid Red 42, Acid Orange 19, Acid Green 25, Acid Red 114, Acid Black 48, Acid Yellow 7, Acid Orange 7, Acid Red 73 or the like. Examples of basic type dyestuffs include Basic Orange 21, Basic Blue 5, or the like. Examples of acid metallized dyestuffs include Acid Yellow 54, Acid Orange 72, Acid Red 186, Acid Violet 56, or the like. In the above enumeration of these various dyestuffs the Colour Index names given in the Colour Index (The Society of Dyers & Colourists and the Association of Textile Chemists and Colourists 2 ed. 1956) are used. The 5-digit Color Index numbers identifying the structural formulae of such dyestuffs are given in Example 5 below.

The following examples illustrate the present invention. They are not to be regarded as limitative. It will be understood that all parts, proportions and percentages referred to herein and in the appended claims are by weight unless otherwise indicated. All references to dyestuffs are to the Colour Index names.

EXAMPLE 1

Cotton and Dacron cloths are treated with either water or with an emulsion of an ethyl acrylate polymer or a graft copolymer of N-vinyl-2-pyrrolidone and ethyl acrylate. Treatment involves dipping each cloth into a bath containing either water or one of the two emulsions. An ethyl acrylate polymer emulsion containing 40% solids is used as one of the treating baths. A graft copolymer emulsion having an N-vinyl-2-pyrrolidone to ethyl acrylate weight ratio of 10 to 90 and containing 40% solids is also used as a treating bath. After treatment, each cloth is dried at 60° C. for 24 hours. Cloths treated with the emulsions contain 0.1% of the active components of the polymers (based on the weight of the treated cloth). The treated cloths are dyed in 0.1% Acid Red 114 or 0.1% Disperse Yellow 5, C.I. 12790, at the boil. Control dyeings are also made with untreated cloths which have been dipped in water and dried. Dyeing results with untreated cloths, ethyl acrylate polymer treated cloths, and graft copolymer treated cloths are tabulated below. Color fastness to washing of the cloths is determined after an AATCC No. 3 Wash Test. The wash fastness tests indicate that treatment of cotton and Dacron cloths with the graft copolymer emulsion gives superior wash fastness and demonstrate the advantages of the graft copolymer emulsion containing 10 parts of vinyl-2-pyrrolidone to 90 parts of ethyl acrylate over an ethyl acrylate polymer that does not contain a comonomer.

ACID RED 114

| Type of cloth | Cotton | Dacron |
| --- | --- | --- |
| Untreated cloth | Light red | Pink. |
| Ethyl acrylate treated cloth | Red | Light red. |
| Graft copolymer treated cloth | Dark red | Red. |

DISPERSE YELLOW 5

| Type of cloth | Cotton | Dacron |
| --- | --- | --- |
| Untreated cloth | Very pale yellow | Pale yellow. |
| Ethyl acrylate treated cloth | Pale yellow | Yellow. |
| Graft copolymer treated cloth | Yellow | Dark yellow. |

The N-vinyl lactam graft copolymer emulsion used in this example was prepared by the procedure described in Example 3 of the copending application of Grosser and Leibowitz Ser. No. 69,572 filed Nov. 16, 1960, now U.S. Patent No. 3,244,658, by using an N-vinyl-2-pyrrolidone to ethyl acrylate ratio of 10 to 90.

EXAMPLE 2

Prescoured 4" x 4" swatches of Dacron cloth are treated by soaking for 10 minutes at room temperature in the following baths containing either water or the indicated emulsions:

(a) control (water)
(b) an ethyl acrylate polymer emulsion containing 34% solids
(c) a graft copolymer emulsion having an N-vinyl-2-pyrrolidone to ethyl acrylate weight ratio of 10 to 90 and containing 34% solids prepared by the procedure described in Example 3 of the copending application of Grosser and Leibowitz Ser. No. 69,572 filed Nov. 16, 1960, now U.S. Patent No. 3,244,658.
(d) a graft copolymer emulsion having an N-vinyl-2-pyrrolidone to ethyl acrylate wegiht ratio of 30 to 70 and containing 34% solids prepared by the procedure described in Example 3 of the copending application of Grosser and Leibowitz Ser. No. 69,572 filed Nov. 16, 1960, now U.S. Patent No. 3,244,658.
(e) a commercial methyl methacrylate-ethyl acrylate copolymer emulsion containing 34% solids.

After dip treatment in one of these baths, the swatch is dried for 24 hours at 25° C. and then dyed in 0.1% Acid Red 114 at the boil. Visual color comparisons are made after dyeing and after an AATCC No. 3 Wash Test. Results of these tests are tabulated below. They show that the graft copolymers improve dye receptivity and that the graft copolymer having the higher N-vinyl-2-pyrrolidone content gives greater dye receptivity.

VISUAL COLOR COMPARISONS

| Treatment with emulsion | After dyeing | After AATCC No. 3 wash test |
| --- | --- | --- |
| (a) | Pink | No color. |
| (b) | Light red | Pale red. |
| (c) | Darker than b | Light red. |
| (d) | Darkest | Red. |
| (e) | >a<b | Pink. |

EXAMPLE 3

The dye receptivity of films prepared from the following polymer emulsions are investigated:

(a) A commercial methyl methacrylate-ethyl acrylate copolymer emulsion containing 46% solids.
(b) A mixture of 90 parts of the methyl methacrylate copolymer emulsion used in (a) and 10 parts of a graft copolymer having an N-vinyl-2-pyrrolidone to ethyl acrylate weight ratio of 30 to 70 prepared by the procedure described in Example 3 of the copending application of Grosser and Leibowitz, Ser. No. 69,572 filed Nov. 16, 1960, now U.S. Patent No. 3,244,658. The proportions in this mixture are based on the solids content of the two polymers used.

(c) A commercial polyvinyl acetate polymer emulsion containing 52% solids.

(d) a mixture of 90 parts of the polyvinylacetate polymer emulsion used in (c) and 10 parts of the graft copolymer emulsion having an N-vinyl-2-pyrrolidone to ethyl acrylate weight ratio of 30 to 70 described above in (b). The proportions in this mixture are based on the solids content of the two polymers used.

Films are prepared from each of the above emulsions by dipping a glass misroscope slide into the emulsion, removing the slide from the emulsion and air drying for 4 hours at room temperature. Each film is then dyed for 10 minutes at 25° C. in 0.1% by weight of the dyestuff of the formula

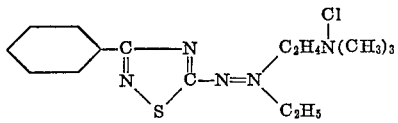

The following order of decrease in dye receptivity is noted: (d), (c), (b), and (a). These results show dye receptivity of both commercial polymer emulsions is improved by incorporation of 10 parts of the graft copolymer. For example commercial emulsion (a) which does not contain the graft copolymer shows only a slight trace of red color after dyeing while (b) shows improved dye receptivity. This example demonstrates the advantages of incorporation of a graft copolymer into a commercial emulsion which does not contain a graft copolymer.

EXAMPLE 4

An anhydrous sample of graft copolymer having an N-vinyl-2-pyrrolidone to styrene weight ratio of 30 to 70 is prepared by spray drying an emulsion of a graft copolymer prepared by the procedure described in Example II of the copending application of Grosser and Leibowitz Ser. No. 69,571 filed Nov. 16, 1960, now U.S. Patent No. 3,244,657. The dried graft copolymer is blended into a general molding grade of commercial polystyrene by milling for 10 minutes at 180° C. Blends containing 5, 10 and 20% (by weight) of the graft copolymer in the polystyrene resin are prepared by this procedure. The graft copolymer is compatible in the polystyrene resin at these concentrations.

Compatibility of the graft copolymer in the polystyrene resin is further verified by preparing films of these mixtures. These films are prepared by placing each mixture under a pressure of 8,000 p.s.i.g. for two minutes at 180° C. Samples of 15 mil films prepared from these mixtures are dyed for 1.5 hours at the boil in both 0.1% Disperse Red 4, C.I. 60755, and 0.1% Disperse Yellow 3, C.I. 11855. Comparison of films containing the graft copolymer with a control shows that mixtures containing graft copolymer have improved dye receptivity. The mixture containing 20% of the graft copolymer shows the most significant improvement in dye receptivity.

EXAMPLE 5

Films of a graft copolymer having an N-vinyl-2-pyrrolidone to ethyl acrylate weight ratio of 30 to 70 are prepared by placing 5 g. of copolymer emulsion containing 40% solids in aluminum dishes and by drying the emulsion sample for 24 hours at 25° C. and then 24 hours at 60° C. This graft copolymer emulsion is obtained by the procedure described in Example 3 of the copending application of Grosser and Leibowitz, Ser. No. 69,572 filed Nov. 14, 1960, now U.S. Patent No. 3,244,658. These films are dyed using 0.1% of the various (A) acid type dyestuffs, (B) basic type dyestuffs and (C) acid metallized dyestuffs that are tabulated below. Dyeings are made at the boil and the dyed films show excellent receptivity to all of the dyestuffs listed below.

(A) Acid type dyestuffs

Acid Yellow 17, C.I. 18965
Acid Orange 3, C.I. 10385
Acid Red 42, C.I. 17070
Acid Orange 19, C.I. 14690
Acid Green 25, C.I. 61570
Acid Red 114, C.I. 23635
Acid Black 42, C.I. 65005
Acid Yellow 7, C.I. 56205
Acid Orange 7, C.I. 15510
Acid Red 73, C.I. 27290

(B) Basic type dyestuffs

Basic Orange 21, C.I. 48035
Basic Blue 5, C.I. 42140

(C) Acid metallized dyestuffs

Acid Yellow 54, C.I. 19010
Acid Orange 72, C.I. 18740
Acid Red 186, C.I. 18810
Acid Violet 56, C.I. 16055

The above examples demonstrate improved dye receptivity may be obtained by applying N-vinyl lactam graft copolymers as surface coatings on polymeric shaped articles or by incorporating these graft copolymers in polymeric shaped articles prepared from polymers which do not have acceptable dye receptivity. Application of these graft copolymers to polymeric articles result in deeper and richer shades when these articles are dyed. N-vinyl lactam copolymers have specific affinities for dyestuffs such as acid dyes, disperse dyes, direct dyes, basic dyes, and premetallized acid dyes.

This invention has been disclosed with respect to certain preferred embodiments. Various modifications and variations thereof will become obvious to persons skilled in the art. It will be understood that such modifications and variations are to be included within the spirit and scope of this invention.

What is claimed is:
1. A process for improving dye receptivity of a polymeric shaped article which comprises treating the article with a graft copolymer of an N-vinyl lactam polymer of the formula

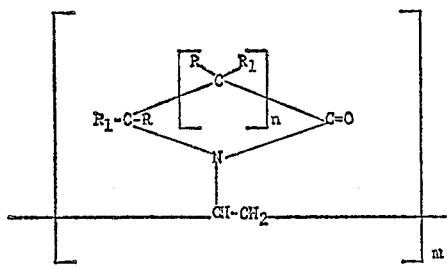

wherein
R is a member selected from the group consisting of hydrogen, methyl and ethyl,
$R_1$ is a member selected from the group consisting of hydrogen and methyl,
$n$ is an integer of from 2 to 4, and
$m$ is an integer of from 4 to 20,000,
prepared by reacting the N-vinyl lactam polymer with
a nonaqueous vinyl monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2 - ethylhexyl acrylate, hexyl acrylate, styrene, methoxystyrene, ethylstyrene and chlorostyrene under polymerization conditions in the presence of a free radical supplying polymerization catalyst.

2. An improved dyeing process which comprises treating a polymeric shaped article selected from the group consisting of cellulose, regenerated cellulose, cellulose acetate, cellulose triacetate, cellulose butyrate, cellulose nitrate, ethyl cellulose, polyethylene, polypropylene, polybutylene, polyvinyl chloride, polyvinyl fluoride, poly(chlorotrifluoroethylene), poly (tetrafluoroethylene), poly(vinylidene chloride), copolymers of vinyl chloride and vinylidene chloride, copolymers of vinyl chloride and vinyl acetate, copolymers of vinyl chloride and vinylidene chloride, acrylonitrile polymers, polystyrene, rubber hydrochloride, copolymers of acrylonitrile and styrene, terpolymers of acryonitrile, butadiene and styrene, poly(methyl methacryate), polycarbonate, and polyethylene terephthalate, with from 0.1 to 20% by weight of a graft copolymer of an N-vinyl lactam polymer of the formula

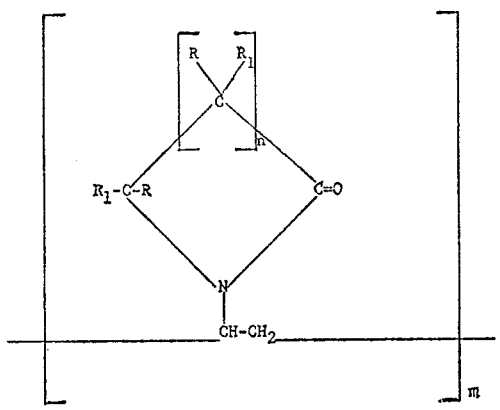

(2)

wherein
  R is a member selected from the group consisting of hydrogen, methyl and ethyl,
  $R_1$ is a member selected from the group consisting of hydrogen and methyl,
  $n$ is an integer of from 2 to 4, and
  $m$ is an integer of from 4 to 20,000,
prepared by reacting the N-vinyl lactam polymer with a nonaqueous vinyl monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2-ethylhexyl acrylate, hexyl acrylate, styrene, methoxystyrene, ethylstyrene and chlorostyrene under polymerization conditions in the presence of a free radical supplying polymerization catalyst to improve dye receptivity, and then dyeing the resulting treated polymeric shaped article.

3. A process as defined in claim 1 wherein the weight ratio of N-vinyl lactam polymer to vinyl monomer is from 5:95 to 60:40.

4. A process as defined in claim 1 wherein the polymeric article is treated by dipping into an emulsion containing from 10 to 60% of the graft copolymer and drying the dipped article prior to dyeing.

5. A process as defined in claim 1 wherein said polymeric article is treated by intimately mixing anhydrous graft copolymer with the polymer material prior to fabrication and dyeing.

6. A process as defined in claim 1 wherein the polymeric article is cellulose.

7. A process as defined in claim 1 wherein the polymeric article is polyethylene terephthalate.

8. A process as defined in claim 1 wherein the polymeric article is polystyrene.

9. A process as defined in claim 1 wherein a graft copolymer of N-vinyl-2-pyrrolidone and ethyl acrylate is used.

10. A process as defined in claim 1 wherein a graft copolymer of N-vinyl-2-pyrrolidone and styrene is used.

11. A process as defined in claim 1 wherein the polymeric shaped article is a fiber.

12. A process as defined in claim 1 wherein the polymeric shaped article is a film.

References Cited

UNITED STATES PATENTS

| | | | |
|---|---|---|---|
| 3,029,220 | 4/1962 | Murdock et al. | 8—100 X |
| 3,190,925 | 6/1965 | Stowe. | |
| 3,206,272 | 9/1965 | Johnson et al. | 8—93 X |
| 3,244,657 | 4/1966 | Grosser et al. | 260—29.6 |
| 3,244,658 | 4/1966 | Grosser et al. | 260—29.6 |
| 3,256,364 | 6/1966 | Bryant et al. | 8—55 X |

NORMAN G. TORCHIN, *Primary Examiner.*

T. J. HERBERT, *Assistant Examiner.*